Oct. 1, 1946.
L. C. RUSSELL
2,408,533
CATTLE STALL PARTITION APPLIANCE
Filed June 9, 1944
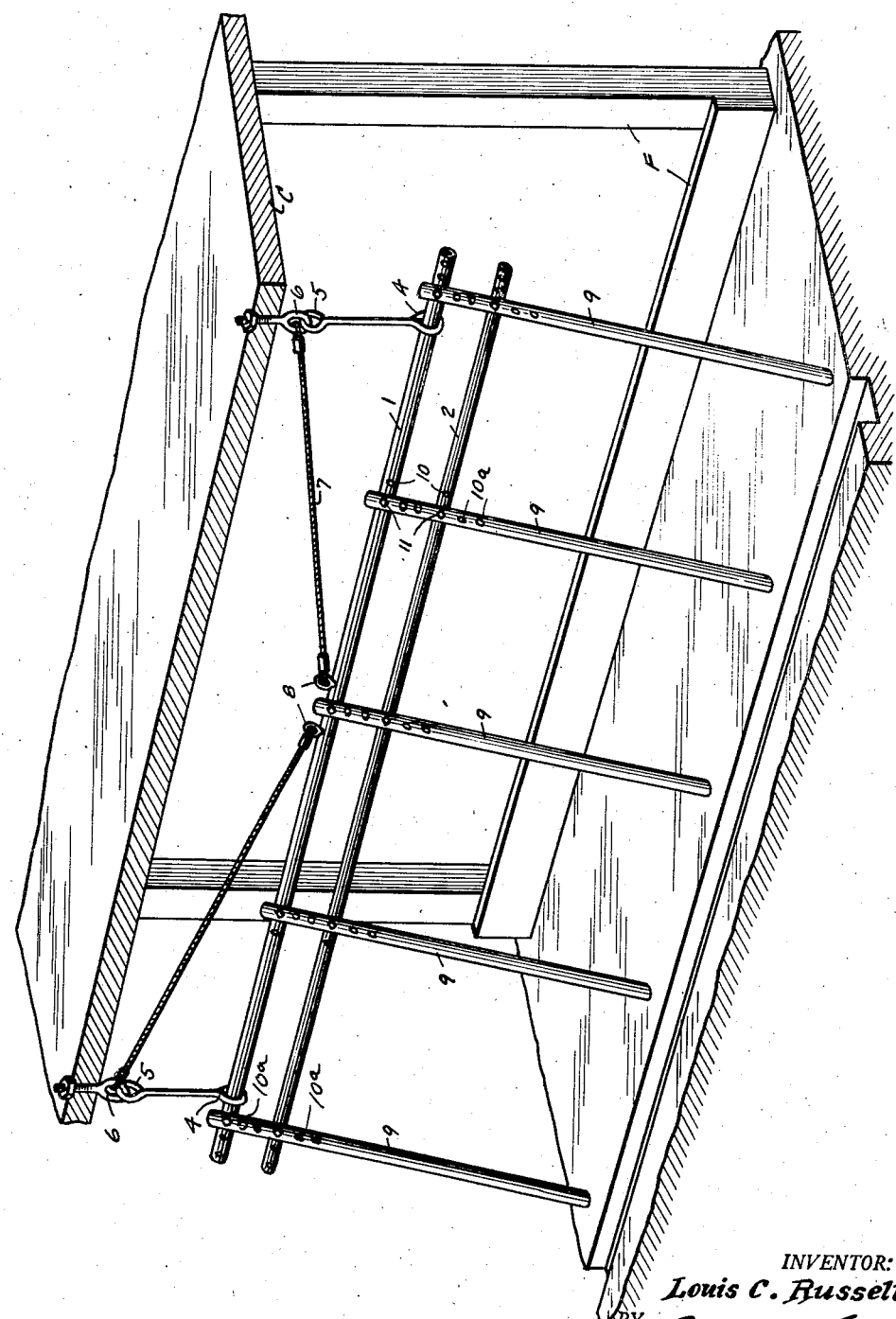
INVENTOR:
Louis C. Russell,
BY Bodell & Thompson
ATTORNEYS.

Patented Oct. 1, 1946

2,408,533

UNITED STATES PATENT OFFICE 2,408,533

CATTLE STALL PARTITION APPLIANCE

Louis C. Russell, McGraw, N. Y.

Application June 9, 1944, Serial No. 539,547

5 Claims. (Cl. 119—15)

This invention relates to partitions for cattle stalls or a unitary structure for forming a plurality of stalls, where the partitions can be shifted into position to form the stalls and out of position to open the space of all the stalls to facilitate working around the cattle in the stalls, and particularly to stalls for cows where they stand or lie with their heads in stanchions.

The invention has for its object a stall partition appliance for a plurality of stalls which is particularly economical in construction and readily applied to the stalls, and which can be readily swung to carry the partitions into or out of operative position. More specifically, it has for its object a stall partition appliance including an overhead bar or frame suspended to swing forwardly and rearwardly from the ceiling over the stalls, and upright partition bars depending from the overhead bar or frame to the floor or platform of the stalls, and movable out of and into operative position by a forward and rearward swinging of the overhead bar or frame, the overhead bar or frame being flexibly suspended to permit lifting up of the partitions when in operative position, so that their lower ends may clear the floor when the frame is being swung to carry the partition bars into and out of operative position.

The invention consists in the novel features and in the combinations and constructions hereinafter set forth and claimed.

In describing this invention, reference is had to the accompanying drawing which is an isometric view of the invention applied to the stall.

1 designates the overhead horizontal bar which is preferably a tube or pipe. 2 designates a second overhead bar or pipe parallel to and below the bar 1. It is carried by the partition bars 9. The bar 1 is flexibly suspended from the ceiling C by hangers, formed with eyes 4, 5 at their lower and upper ends, the eyes at the lower ends receiving the end portions of the upper bar 1 and the eyes 5 at their upper ends extending through the eyes of the eye bolts 6 extending into the ceiling C. Any suitable number of hangers may be employed, but for a single unit, say of four stalls, however, two of such hangers located at the ends of the bar 1 are ordinarily sufficient. The bar 1 may be further supported by guy wires or cables 7 secured to the eye bolts 6 at their ends and to an eye bolt 8 extending through the intermediate portion of the upper bar 1.

9 designates the partition bars which are also usually tubular, these extending transversely of the horizontal bars 1, 2, each bar 9 being secured to each of the bars 1, 2 by fastening members, as bolts 11, extending transversely through holes 10 in the bars 1, 2 and through holes 10a in the partition bars 9. The partition bars, when in operative position, usually stand at an oblique angle rearwardly toward the rear ends of the stalls, as seen in the drawing, this position being usually near the rear portion of the cow to protect the udders, etc., from being trampled on by adjacent cows, when the cow is lying down. With the cows' heads in the stanchions, the cows are confined by these partitions to their own stalls, spaces in line with the stanchions. To swing the partitions out of the way to permit working among the cows, as for milking the cows, by hand or by milking machines, or for working in among the cows, when they are in the stalls, the partitions may be swung forwardly toward the stanchions by pushing upwardly on the lower bar 2 and forwardly toward the stanchions, the upward movement causing the lower ends of the partition bars to clear the floor when swung in an arc. The reverse of this operation moves the partitions back to their operative position. The stanchions, not shown, may be of any suitable construction. The frame in which they are mounted is designated F.

The width of the stalls may be varied to suit conditions, say from thirty-six inches to thirty-eight inches wide, and for this purpose, the pipes or bars 1, 2 are provided with additional bolt holes 10. The partition bars are formed with additional holes 10a for receiving the bolts 11, to permit the adjustment of the bar 2 to different height and also the partition bars to be vertically adjustable to be brought into juxtaposition to the floor.

As this cattle stall partition appliance consists of an overhead frame for suspension from the ceiling and upright partition bars, it can be readily and economically installed and is easily operable and affords full protection to the cows against injury and from being trampled on, and also affords easy access for working in the stalls, either when the cows are in the stalls or when the stalls are vacant.

What I claim is:

1. A cattle stall partition appliance including a horizontal overhead bar common to a plurality of stalls, means for flexibly suspending the bar from the ceiling to swing forward and rearward, and upright partition bars suspended from the horizontal bar to swing with the overhead bar forward and rearward and extending to the floor, all whereby the partition bars are shiftable into and out of operative partition forming position.

2. A cattle stall partition appliance including a horizontal overhead bar common to a plurality of stalls, means for flexibly suspending the bar from the ceiling to swing forward and rearward, and upright partition bars suspended from the horizontal bar and extending to the floor, all whereby the partition bars are shiftable into and out of operative partition forming position, and a second overhead horizontal bar parallel to the former horizontal bar and secured to the partition bars.

3. A cattle stall partition appliance including a horizontal overhead bar common to a plurality of stalls, means for flexibly suspending the bar from the ceiling to swing forward and rearward, and upright partition bars suspended from the horizontal bar and extending to the floor, all whereby the partition bars are shiftable into and out of operative partition forming position, and a second overhead horizontal bar parallel to the former horizontal bar and secured to the partition bars, the horizontal bars and the partition bars being tubular, and fastening members extending transversely through the horizontal bars and the partition bars.

4. A cattle stall partition appliance including a horizontal overhead bar common to a plurality of stalls, means for flexibly suspending the bar from the ceiling to swing forward and rearward, and upright partition bars suspended from the horizontal bar and extending to the floor, all whereby the partition bars are shiftable into and out of operative partition forming position, and a second overhead horizontal bar parallel to the former horizontal bar and secured to the partition bars, the horizontal bars and the partition bars being provided with means by which the partition bars are adjustable to different spacings along the horizontal bars.

5. A cattle stall partition appliance including a horizontal overhead bar common to a plurality of stalls, means for flexibly suspending the bar from the ceiling to swing forward and rearward, and upright partition bars suspended from the horizontal bar and extending to the floor, all whereby the partition bars are shiftable into and out of operative partition forming position, and a second overhead horizontal bar parallel to the former horizontal bar and secured to the partition bars, the horizontal bars and the partition bars being provided with means by which the partition bars are adjustable to different spacings along the horizontal bars, and the partition bars adjustable vertically to bring their lower ends in juxtaposition to the floor.

LOUIS C. RUSSELL.